United States Patent [19]

Bevilacqua

[11] 4,270,979
[45] Jun. 2, 1981

[54] PARALLEL FLOW COLLAR FOR REDUCING VIBRATION OF A ROD WITHIN A DIFFUSER

[75] Inventor: Frank Bevilacqua, Windsor, Conn.

[73] Assignee: Combustion Engineering, Inc., Windsor, Conn.

[21] Appl. No.: 970,694

[22] Filed: Dec. 18, 1978

[51] Int. Cl.³ .................. G21C 3/30; G21C 7/08
[52] U.S. Cl. ........................... 176/78; 176/35; 176/81; 239/552
[58] Field of Search .............. 176/35, 36 C, 36 S, 176/56, 76, 78, 81, 86 R, 87; 137/561 A, 597, 599; 251/24; 239/493, 518, 520, 552

[56] References Cited

U.S. PATENT DOCUMENTS

| 3,432,390 | 3/1969 | Dean | 176/78 |
|---|---|---|---|
| 3,619,367 | 11/1971 | Gumuchian | 176/78 |
| 3,770,583 | 11/1973 | Klumb | 176/78 |
| 3,861,999 | 1/1975 | Zmola | 176/78 |

OTHER PUBLICATIONS

Fricke, Nuclear Science & Engineering: 48, 87–102, (1972).
Miller, et al., "Theoretical Analysis of Flow Induced Vibration of a Blade, etc.", ASME, 11/27/66.

Primary Examiner—Donald P. Walsh
Attorney, Agent, or Firm—L. James Ristas

[57] ABSTRACT

The oscillatory forces acting on an eccentric rod within a diffuser are reduced by an annular bypass collar around the rod immediately upstream of the diffuser region. The collar includes a sleeve portion that completely surrounds the rod and a bypass channel outside the sleeve which carries most of the fluid into the diffuser region on a path parallel to but spaced from the rod. The collar is most effective when a multiplicity of discrete bypass channels are provided.

12 Claims, 6 Drawing Figures

PARALLEL FLOW COLLAR FOR REDUCING VIBRATION OF A ROD WITHIN A DIFFUSER

BACKGROUND OF THE INVENTION

This invention relates to reducing the flow induced vibration of a center body member within a conduit having an abrupt increase in cross section, and in particular to reducing the vibration of a nuclear reactor control rod in its guide tube.

The fission rate and thus the heat generation in modern power reactors is usually controlled by the insertion and removal of control rods into or between fuel assemblies in the reactor core. Particularly in reactors of the pressurized-water type, cylindrical control rods are reciprocated within guide tubes which are part of the fuel assembly. The fuel assemblies are subjected to the flow of primary coolant in order to remove the heat generated in the fuel. When in the core, control rods also produce heat through the nuclear transformation associated with their high neutron absorption rate, and so the control rods must also be cooled. Thus a requirement is imposed on the design of the guide tube for assuring that a minimum flow rate through the guide tubes will exist at all times.

During power production most of the control rods are maintained in a withdrawn position above the core. The lower tips of the rods, however, are not completely withdrawn from the guide tubes. Recent operating experience has shown that rodded fuel assemblies that have been in an operating reactor for a period of time have significant wear on the inner walls of the guide tubes at precisely the elevation corresponding to the withdrawn control rod tips.

It is known that under some conditions a self-excited vibration of a blade-type control element can occur when the insertion of the blade into a narrow upstream section of the flow path between fuel assemblies is less than a critical distance. Also, the fluid flow rate through the path must exceed a critical value for this vibration to occur. Suggestions have been made for reducing these vibrations by inserting labyrinth-type flow restrictions at various locations along the flow path downstream of the leading end of the blade, or by introducing a mechanical restraint to provide a lateral force which prevents the build up of small random vibrations.

Flow induced periodic vibrations have also been observed in arrangements having a cylindrical rod eccentrically located in an annular diffuser. It is believed that two kinds of vortices interact to produce the periodic driving force. The first kind, axial vortices, originate in the region of the rod tip and travel along the rod before entering the diffuser region where vortex bursting occurs. The other kind, diffuser vortices, form as a contrarotating pair in the diffuser region as a result of the separated flow pattern surrounding the eccentric rod. These two kinds of vortices interact to produce the periodic driving force on the rod in the diffuser region. It has been proposed to provide a circumferential fence in the flow path downstream of the diffuser, or to provide strakes in the outer wall of the diffuser starting at the diffuser mouth and extending longitudinally downstream of the diffuser. These solutions are not practical for use in nuclear reactors because the diffuser region can be very large.

Since nuclear reactor control rods often are not exactly centered in their guide tubes, the rod tip has a tendency to assume a rest position against the inner wall of the tube. Any significant tip vibration against the inside of the guide tube could produce wear on the inner wall and ultimately perforate the guide tube. It has been found that, except for significantly reducing the mass flow rate in the guide tube, the above suggested remedies for reducing flow induced vibration of a control rod are only marginally effective. If the flow rate is reduced sufficiently to eliminate vibration, it is often not possible to adequately cool the control rod.

SUMMARY OF THE INVENTION

It is an object of the invention to provide a device for reducing the flow induced vibration of an elongated cylindrical rod member disposed in an elongated tube having a diffuser region downstream of the rod tip.

It is a further object to provide a fuel assembly that will greatly reduce the flow induced vibration of a nuclear reactor control rod suspended in the withdrawn position in a guide tube.

It is another object to provide a fuel assembly having guide posts at its upper end that suppress flow induced control rod vibration yet do not interfere significantly with control rod scram nor significantly impede the flow of coolant.

The present invention reduces the oscillatory force acting on an eccentric rod within a diffuser by providing an annular bypass collar around the rod immediately upstream of the diffuser region to reduce the fluid flow velocity at the diffuser mouth immediately adjacent to the rod. In the broadest aspect of the invention, the collar includes a sleeve portion adapted to completely surround the rod, and a bypass channel outside the sleeve through which most of the coolant flows. Although the mechanism causing the reduction in rod oscillation is not understood fully, it is believed that a reduced flow velocity immediately adjacent to the eccentric rod produces less intense diffuser vortices. Furthermore, the greatest portion of the coolant flow enters the diffuser parallel to but spaced from the rod. It is believed that the axial vortices that normally spiral around the eccentric rod thus tend to break up and become less coupled to the diffuser vortices so that the periodic interaction between them is lessened.

The collar is most effective when a multiplicity of discrete bypass channels are disposed parallel to and fluidly isolated from the rod. The collar preferably has an integral sleeve portion having an inner diameter approximately equal to or less than that of the remainder of the guide tube, and a splined outer portion which provides independent paths for the axial bypass flow. The splined portion of the collar more effectively dissipates the axial vortices and reduces their interaction with the diffuser vortices. In the preferred embodiment, the upper portion of the control rod guide tube is enlarged to snugly receive the splined collar.

BRIEF DESCRIPTION OF THE DRAWINGS

Other objects and advantages of the invention will be evident from the accompanying description and drawings in which.

DESCRIPTION OF THE PREFERRED EMBODIMENT

Figure 1:
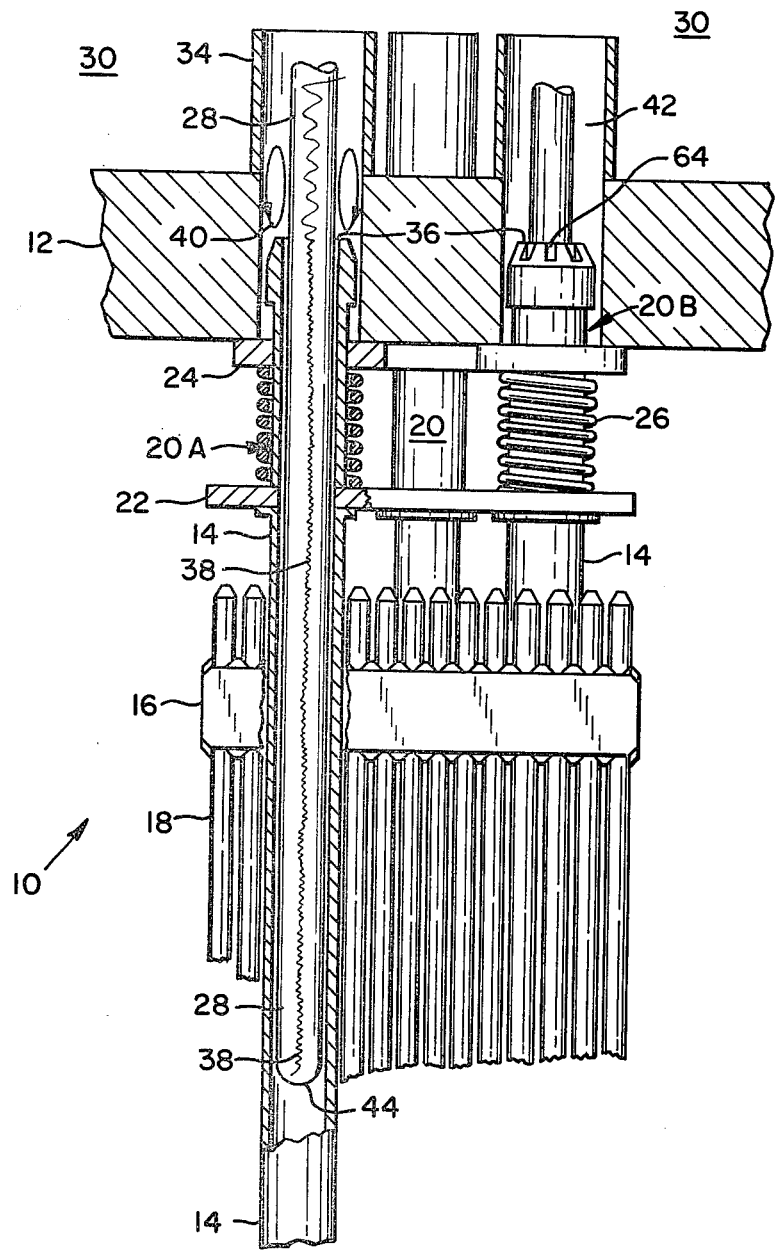
FIG. 1 is a partially sectioned elevation view of the upper end of a nuclear fuel assembly showing the interface with the upper guide structure and control rods.

FIG. 1 shows the upper portion of a nuclear reactor fuel assembly 10 engaged with the fuel alignment plate 12 during typical nuclear reactor operation conditions. The fuel assembly 10 includes a plurality of guide tubes 14 to which are attached fuel spacer grids 16 which form a matrix to support a plurality of fuel elements 18. The guide tubes 14 typically extend a distance of approximately 13 feet from the fuel alignment plate 12 to the fuel assembly lower end fitting (not shown). The guide tubes 14 have guide posts 20A, 20B fastened to the upper ends of the guide tubes and rigidly connected to a perforated flow plate 22. A spider-shaped holddown plate 24 having one lobe associated with each guide post 20 is located below the alignment plate 12 and is vertically movable relative to the guide posts 20 in order to transmit a downward force from the alignment plate 12 through the holddown springs 26 to the guide tubes 14 whereby the assembly 10 is held down against the upward flow of the coolant over the fuel elements.

During the course of their lifetimes within a reactor, most assemblies 10 will have control rods 28 located within the guide tubes 14. The control rods 28 are typically about 15 feet long and are rigidly held at their upper ends (not shown) and reciprocated vertically within the guide tubes 14. The control rods 28 are protected from the highly turbulent coolant flow that interacts with the fuel elements 18 below the alignment plate 12 and from the strong cross-flows existing in the plenum region 30 above the alignment plate 12. This protection is afforded by the guide tubes 14, the posts 20, the alignment plate 12, and shrouds 34 in the plenum region 30. Although not shown, the alignment plate 12 has a plurality of flow passages for directing the coolant flow from the fuel assemblies 10 into the plenum region 30.

A continuous flow of coolant must be maintained within the guide tube 14 to provide cooling to the control rods 28. Because the control rods 28 are so elongated, each rod is unlikely to be exactly centered within its respective guide tube 14 and therefore, especially when the rod is in the withdrawn position shown in FIG. 1, the rod will be eccentric relative to the guide post exit 36. It is believed that such eccentricity produces a pattern of axial vortices 38, with axes generally vertical, and diffuser vortices 40, with axes generally in a horizontal plane, as schematically represented. The structure associated with the control rod 28 as it exits the guide posts 20 can be generally described as a center rod eccentrically disposed within a rather abrupt diffuser region represented generally at 42. It should be appreciated that depending on the particular nuclear reactor, the exact structure defining the diffuser region 42 and the diffuser cross section can be quite different.

During reactor operation, most control rods 28 are maintained in the withdrawn position so that the control rod tip 44 is continuously located, depending on the particular reactor, at a fixed elevation approximately 1 to 2 feet from the guide post exit 36. Inspection of fuel assemblies 10 removed from operating reactors shows severe fretting on the inside of the guide tube 14 at precisely the elevation corresponding to the control rod tip 44 in the withdrawn position. Analyses were made and tests outside the reactor were performed in order to identify the mechanism causing the guide tube wear. Although the source of wear has not been completely explained analytically, it was found that the vibrations causing the control rod interaction with the guide tubes 14 are apparently self-excited and predominantly at the natural frequency of the control rod (about 4H for a typical control rod). These vibrations are believed to be the result of guide tube flow effects caused by driving forces related to the periodic interaction near the guide post exit 36 of the axial vortices 38 with the diffuser vortices 40, as described above.

A variety of devices were tested in a flow loop wherein the dimensions and flow rates were similar to typical reactor operation conditions. Most of the tested devices had very little effect in reducing the vibration of the control 28 rod in the guide tube 14. Only the improvements described below resulted in a dramatic decrease in the vibration. Another device that showed significant improvement is the subject of a related patent application filed on even date herewith, entitled "Radially Channeled Guide Post for a Nuclear Fuel Assembly," by F. D. Lawrence and assigned to the same assignee.

Figure 2:
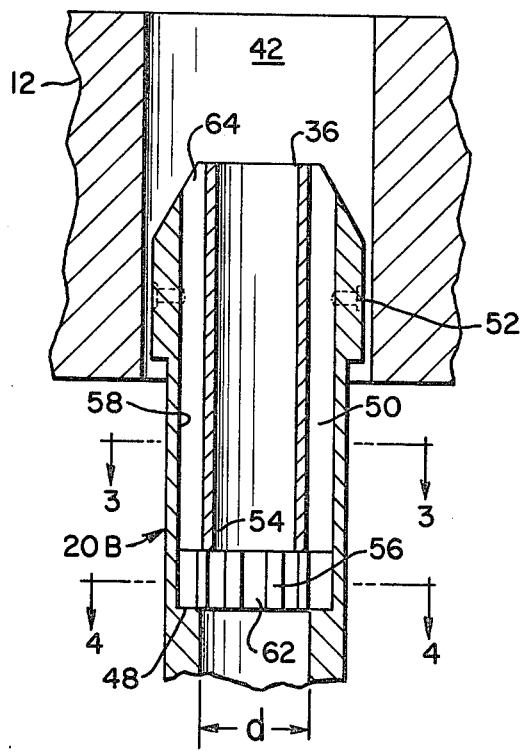
FIG. 2 is a sectioned elevation view of the preferred embodiment of the invention.
Figure 3:
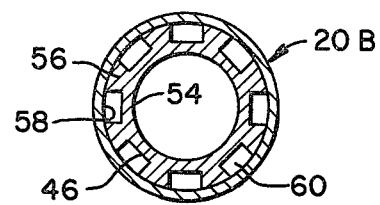
FIG. 3 is a section view along the lines 3—3 of FIG. 2.

FIGS. 2 and 3 show the preferred embodiment of the improved guide post 20B having a collar insert 46 found to be very effective in reducing the rod vibration. The prior art post 20A shown in FIG. 1 can be adapted to accommodate the collar 46 by boring the upper end of the post 20B from the post exit 36 down to a ledge 48. The collar 46 is adapted to fit snugly within the bore 50 and can be secured therein with set screws 52 or fastened by weld or other means. The collar has a sleeve portion 54 having an inner diameter equal to or slightly less than the inner diameter d of the guide tube, and preferably having a smooth, integral surface. The sleeve inner diameter is determined primarily by the scram time requirements of the particular nuclear reactor, such that the minimum diameter affording acceptable scram time is provided. The outer portion of the collar 46 has a plurality of axially elongated splines 56 which preferably contact the post wall 58 and form a plurality of discrete flow channels 60 surrounding the sleeve 54. It is believed that at least four channels 60 are needed to provide significant improvements in vibration resistance relative to the splineless bypass sleeve described below. The best results were obtained with a collar 46 having eight channels 60. Whether or not splines 56 are provided, the cross-sectional flow area outside the sleeve 54 should preferably be at least three times the flow area between the sleeve and rod to be inserted inside the sleeve.

Figure 4:
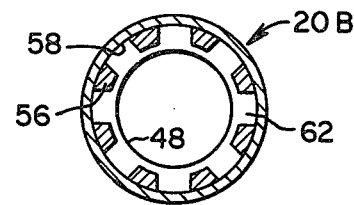
FIG. 4 is a section view along the lines 4—4 of FIG. 2.

FIGS. 2 and 4 show how the preferred collar 46 is adapted to direct the coolant flow from the lower portion of the guide post 20B into the channels 60. The splines 56 extend below the integral sleeve 54 of the collar 46 and rest on the ledge 48 of the guide post 20B. The absence of the sleeve 54 in this portion of the collar 46 results in a plurality of bypass slots 62 through which the coolant may enter the channels 60 between the splines 56.

Referring to FIGS. 1 and 2, the essential feature of the invention is that most of the upwardly flowing coolant is separated from the control rod 28 just before the coolant exits the post 20B at 36 and enters the mouth of the diffuser region 42. It is believed that the effect on the control rod 28 of the interaction between the axial vortices 38 and the diffuser vortices 40 is greatly reduced when most of the coolant flow enters the diffuser region 42 slightly spaced away from the control rod 28, as shown at 64. Thus the collar 46 permits only a relatively small flow to exit the post 20B immediately adjacent to the rod 28. It is also believed that the splines 56 tend to break up the axial vortices 38 before these vortices enter the diffuser region 42 and this also reduces the intensity of the periodic driving force in the diffuser region.

As an example of the improvement provided by the preferred embodiment of the invention, the results of comparative flow tests on different guide posts 20A and 20B in an arrangement with a guide tube 14, diffuser region 42 and shroud 34 equivalent to the structure shown in FIG. 1 will be discussed. In the tests the guide tube 14 inside diameter was 0.900 inches and the control rod 28 outside diameter was 0.816 inches. The control rod 28 was 14 feet long and fixedly suspended at its top. The mass of the control rod 28 was equivalent to a stainless steel clad column of $B_4C$ pellets. The rod tip 44 was located 21 inches below the guide post exit 36. The standard prior art post 20A was similar to that depicted in FIG. 1 and had an inside diameter of 0.900 inches. Accelerometer probes were connected to the midspan of the control rod 28. At the typical operating volumetric flow rate of 9 gallons per minute (4500 pounds per hour) flow through the guide tube 14 and standard post 20A, the rod response was 0.23 g's. Since the guide tube 14 in the test model was transparent, the control rod tip 44 could be observed oscillating against the guide tube 14 inner wall. The test was repeated with the same flow conditions using the improved guide post 20B shown in FIGS. 1, 2, 3 and 4 with a collar 46 about 3.5" long. The sleeve 46 inner diameter was 0.866 inches and the post bore 50 had an outer diameter of 1.330 inches. Each channel 60 was 0.25 by 0.165 inches in cross section. The response at the rod midspan dropped down to only 0.05 g's and there was no visible vibration of the tip 44 against the guide tube.

Figure 6:
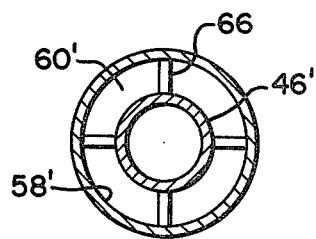
FIG. 6 is a section view along the lines 6—6 of FIG. 5.
Figure 5:
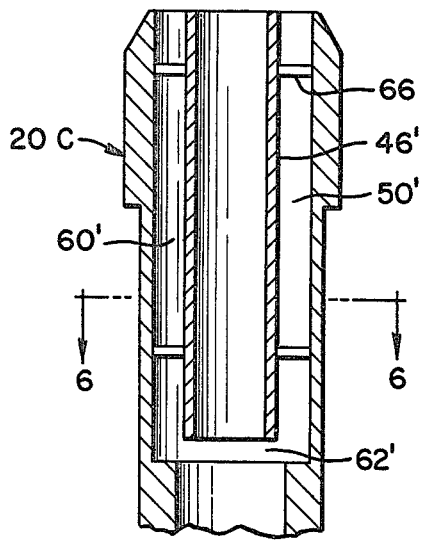
FIG. 5 is a sectioned elevation view of a different embodiment of the invention.

FIGS. 5 and 6 show an alternate embodiment of the invention which is less effective than the preferred embodiment but which can under some circumstances reduce the vibration sufficiently to permit satisfactory fuel assembly performance. In this embodiment, the post 20C also has an enlarged bore 50'. A sleeve 46' is adapted to surround the control rod to be inserted therein with sufficient clearance to permit satisfactory control rod scram. The bypass channel 60' is essentially an annulus around the sleeve 46' interrupted only by braces 66 which suspend the sleeve 46' within the bore 50' whereby an annular slot 62' is formed to enable the upward flowing coolant to bypass the rod. The braces 66 could be in the form of screws (not shown) penetrating the guide tube post 20C through threaded openings into threading engagement with the sleeve 46'. Other arrangements for providing the sleeve 46' in the upper portion of the guide post 20C in a manner permitting parallel bypass flow through channels 60' whereby the bypass flow is deposited slightly spaced from the control rod, will fall within the scope of the invention.

What is claimed is:

1. A flow collar for reducing the flow induced oscillation of a rod within a tube that abruptly opens into a diffuser region downstream of the rod tip, comprising:

a sleeve rigidly attached with respect to the tube, the sleeve circumferentially surrounding the rod at the diffuser entrance and extending upstream thereof, for partitioning the flow entering the diffuser into a relatively low velocity flow immediately adjacent to the rod and a higher flow entering the diffuser laterally of and in a direction substantially parallel to the rod.

2. A flow collar for reducing the flow induced oscillation of a rod within a tube that abruptly opens into a diffuser region downstream of the rod tip comprising:

a sleeve portion circumferentially surrounding the rod at the diffuser entrance and extending upstream thereof, the sleeve having an inner diameter no larger than that of the tube but larger than that of the rod; and at least one parallel flow channel extending longitudinally along the outside of the sleeve, the channel being in fluid communication with the tube below the sleeve, whereby some of the flow upstream of the sleeve is directed through the channel and enters the diffuser region laterally of and in a direction substantially parallel to the rod.

3. The flow collar of claim 2, wherein a plurality of flow channels are formed between a plurality of elongated splines attached to the outside of the sleeve and oriented parallel to the axis of the tube.

4. The flow collar of claim 3, further including means for connecting the outer surfaces of the splines whereby the sleeve, splines, and said means define the plurality of discrete flow channels.

5. An improved fuel assembly to be placed in a nuclear reactor, the fuel assembly having a guide tube, the tube including a guide post at its upper end, the post and tube adapted to receive a cylindrical control rod reciprocable from above the assembly, and to contain an upward flow of coolant, the post exit to be located in the mouth of a diffuser region, wherein the improvement comprises means supported by the post and adapted to circumferentially surround the rod at the diffuser entrance and extending upstream of the entrance for partitioning the flow entering the diffuser into a relatively low velocity flow immediately adjacent to the rod when the rod is located within the assembly, and a higher flow entering the diffuser laterally of and in a direction substantially parallel to the rod.

6. The improved fuel assembly of claim 5, wherein said means forms at least one flow channel disposed parallel to and fluidly isolated from the portion of said means adapted to receive the rod.

7. The fuel assembly of claim 6, wherein the upper portion of the post has an inner diameter larger than the inner diameter of the tube and wherein said means includes a collar having an integral sleeve portion adapted to surround the rod at the diffuser entrance and a splined outer portion defining a plurality of discrete bypass channels.

8. The assembly of claim 7, wherein the sleeve portion has an inner diameter no larger than that of the tube but larger than that of the rod and wherein the splines extend into contact with the enlarged portion of the post whereby the sleeve, splines, and post inner wall defines the flow channels.

9. The assembly of claim 8, wherein the splines are longer than the sleeve thereby forming flow slots through which the guide tube flow may be diverted from the tube into the flow channels.

10. The fuel assembly of claim 9, wherein the channels are substantially rectangular and symmetrically spaced around the outside of the sleeve.

11. The assembly of claim 6 or 7, wherein the cross-sectional flow area of the channels is at least 3 times the cross-sectional area between the sleeve and the rod to be inserted therethrough.

12. The fuel assembly of claim 7, wherein the sleeve includes between five and eight splines, the distance between proximate splines being substantially equal to the width of each spline.

* * * * *